Jan. 12, 1937.                H. A. FLOGAUS                2,067,758
                           ENGINE COOLING SYSTEM
                            Filed May 18, 1936
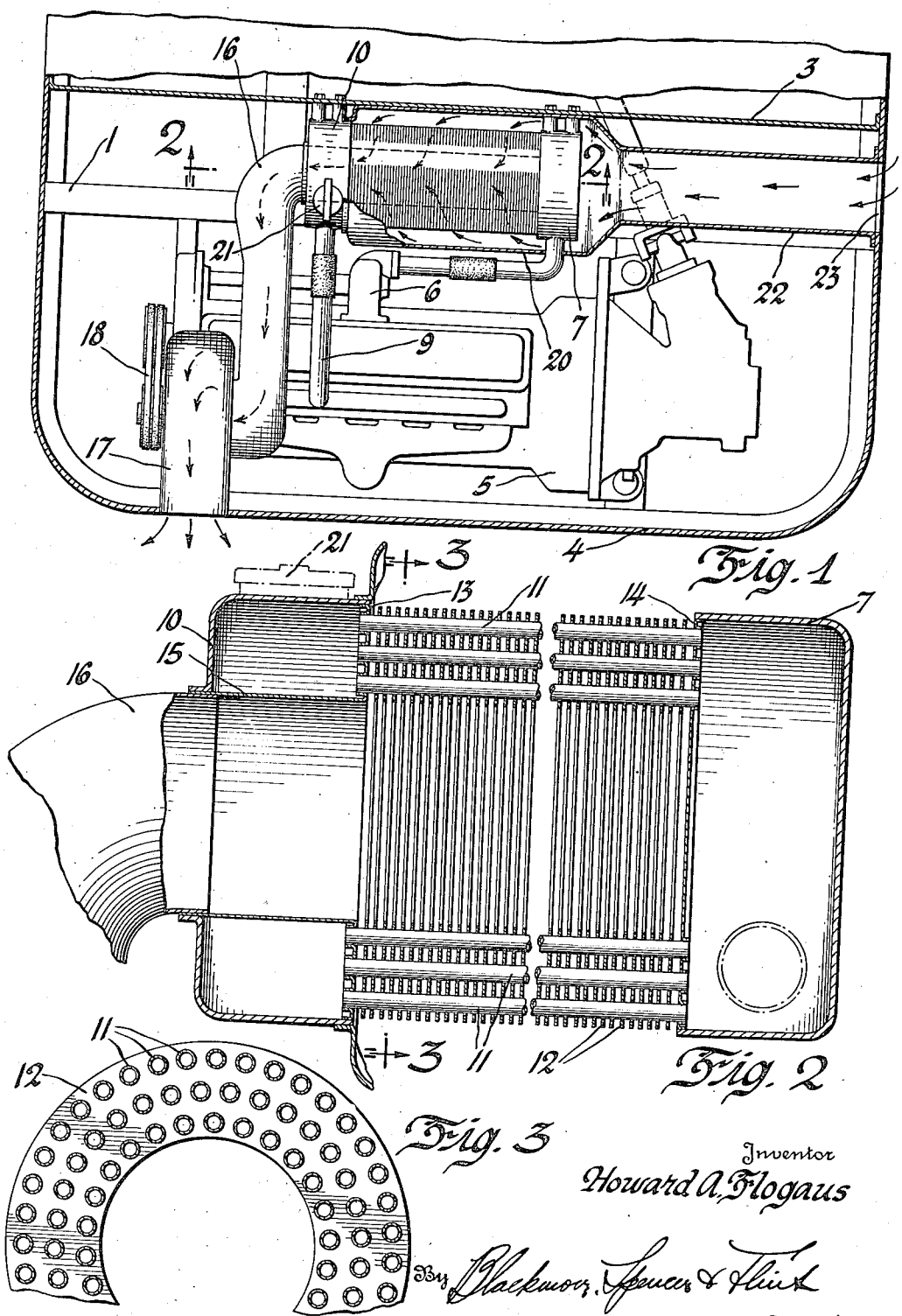
Inventor
Howard A. Flogaus
By Blackmore, Spencer & Flint
Attorneys Patented Jan. 12, 1937

2,067,758

UNITED STATES PATENT OFFICE 2,067,758

ENGINE COOLING SYSTEM

Howard A. Flogaus, Ferndale, Mich.

Application May 18, 1936, Serial No. 80,229

3 Claims. (Cl. 180—54)

This invention relates to cooling of engines which are located within an enclosed compartment at the rear of a motor vehicle and was designed especially with reference to the so-called street car type of passenger coach. As generally constructed these vehicles involve a box-like body mounted upon front and rear wheels with the driver's station at the front and the engine for driving the rear wheels located under the back seat and adjacent the rear wall of the body.

From the standpoint of appearance, as well as compact design and manufacturing convenience, the preferred location of the engine cooling radiator is within the engine compartment, but there is presented the problem of passing clean, cool air in large quantities through the radiator for the proper absorption of heat. The rearward location of the power plant, as well as its enclosure, present a situation wherein impacted air, due to vehicle movement as in the case of a forwardly disposed radiator, is lost and additionally the air within the compartment beyond the road wheels is likely to be ladened with dust lifted as the vehicle passes over the ground. The dusty stream of air not only cuts down the heat absorbing ability of the air but deposits on the heat radiating surfaces an insulating coating of dirt so that the efficiency of the cooling system is seriously impaired. With these things in mind it is here proposed to provide an improved cooling system to be located wholly within the engine compartment and including a heat dissipating core, especially designed to handle a large volume of air within a minimum of space and surrounded by a shroud for the entrance of comparatively clean air from outside the engine compartment with an exhaust conduit having associated therewith an engine driven fan of large capacity to supply air in abundance.

For a better understanding of the structure, reference will be made to the accompanying drawing wherein Figure 1 is a plan view of a rearwardly located engine compartment showing a portion of the body in section; Figure 2 is an enlarged detail sectional view of the cooling unit and is taken on line 2—2 of Figure 1; and Figure 3 is a transverse section taken on line 3—3 of Figure 2.

In the drawing, the numeral 1 indicates the underframing of the motor vehicle and 3 is a bulkhead or partition cooperating with the rear wall 4 of the vehicle body to provide the engine compartment and separating the engine compartment from the interior space for passengers. Supported upon the framing 1 is a transversely disposed power plant 5 including an internal combustion engine, from the power output end of which extends an angularly projected propeller shaft which may lead diagonally to a centrally located differential mechanism between the rear driving wheels.

The closed circulatory cooling system includes an engine driven pump 6 which supplies water or other cooling liquid from the outlet header 7 of a radiator supported by the bulkhead 3 and directs such liquid through the engine jacket for the absorption of heat. Hot water leaving the jacket flows through the conduit 9 to the inlet header 10 of the radiator, the water returning to the outlet header 7 through a series of pipes or tubes 11 connecting the spaced headers. These connecting tubes 11 are spaced apart and arranged in one or more circular rows as seen particularly in Figure 3 to provide a central open space extending from one tank to the other. The tubes carry a series of spaced sheet metal rings 12, each common to all the tubes to afford heat radiating fins with radially extending passages therebetween for the flow of air which takes up heat transferred into the tube and fin assembly upon flow of hot water between the tanks. The rings 12 are open at the center and cooperate with the circumferentially arranged tubes in providing the interiorly hollow core for the axial passage therethrough of the cooling air stream.

The opposite ends of the several tubes 11 project into flanged openings in the adjacent walls 13 and 14 of the inlet and outlet headers 10 and 7. In the case of the end wall 14 this extends continuously across the header and closes the adjacent end of the hollow core assembly. The other wall 13, however, is provided with an inwardly extending tube or sleeve 15 in alinement with the hollow interior of the core to afford an air outlet extending through the inlet tank 10. Fitted into the end of the tube 15 is the elbow of a conduit 16 which extends rearwardly across the top of the engine 5 and leads to the interior of the fan casing 17 which discharges through an opening in the rear wall 4 of the body. The casing 17 contains a high velocity, centrifugal fan driven by the belts 18 from the engine power shaft for producing a draft of air whereby air is drawn radially through the fin and tube assembly and exhausted axially therefrom into the conduit 16 for ejection through the rear wall of the body.

By proper selection and proportion of parts the air drawn through the core may be of such volume that only a relatively small area of radiating surface is needed wherefore the size of the radiator core can be comparatively small. The width and spacing of the fins should be such that the air particles do not become heat logged in their travel over the radiating surface.

To insure a supply of clean air to the core it is proposed to enclose the assembly within a cylindrical casing 20, the inner end of which may be turned inwardly and sleeved onto the inlet tank 10 in a manner to permit free access to the closure cap 21 for the filling spout of the liquid system. The other end of the casing 20 projects beyond the outlet tank 7 and is reduced in diameter to provide an air flow conduit 22 which is fastened to the side wall of the body in alinement with an air entrance opening 23 located at a height considerably above the ground for the admission of air free from the dust thrown up by the vehicle.

From the above description it will be apparent that there is provided a cooling system which may be located wholly within the rear engine compartment in space readily available and which is so constructed and arranged that a large quantity of clean air is supplied by an engine driven fan for flow over the fins in a direction radially of the hollow tube assembly and for passage axially therefrom.

I claim:

1. In a heat exchanger, a series of spaced fin plates each having a central opening therethrough, a circumferential succession of tubes extending through the fin plates and arranged in relation to the opening in the fins to provide a central duct, inlet and outlet headers at opposite ends of the fin and tube assembly in communication with the tubes, at least one of said headers extending across and closing the end of said central duct, and draft producing means to move a fluid axially through said duct and radially across the fin plates.

2. In a heat exchanger, a series of spaced fin plates each having a central opening therethrough, a circumferential succession of tubes extending through the fin plates and arranged in relation to the opening in the fins to provide a central duct, inlet and outlet headers at opposite ends of the fin and tube assembly in communication with the tubes, one of said headers extending across and closing one end of the central duct and the other header having a central opening cooperating with said duct for the axial flow of fluid therethrough and a draft producing device associated with the central opening of said header.

3. In a motor vehicle having a rearwardly disposed engine compartment, an engine cooling system including a radiator having inlet and outlet headers and a circular series of water flow tubes connecting said headers and carrying heat radiating fins, a shroud surrounding said tube assembly and having an air entrance opening in one wall of the engine compartment, an air exhaust conduit leading from the center of the fin and tube assembly and engine driven draft producing means for promoting air flow through said shroud and over the fin and tube assembly for exhaust through said conduit.

HOWARD A. FLOGAUS.